United States Patent
Edquist et al.

(10) Patent No.: US 10,816,161 B1
(45) Date of Patent: Oct. 27, 2020

(54) MULTIFACETED DISCONTINUOUS REFLECTOR

(71) Applicant: B/E Aerospace, Inc., Winston-Salem, NC (US)

(72) Inventors: John D. Edquist, Milwaukee, WI (US); Lu Bai, Lake Oswego, OR (US); Christopher A. Keith, Wilsonville, OR (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/420,343

(22) Filed: May 23, 2019

(51) Int. Cl.
| | | |
|---|---|---|
| *B64D 47/06* | (2006.01) |
| *F21S 43/31* | (2018.01) |
| *F21V 7/04* | (2006.01) |
| *F21V 7/07* | (2006.01) |
| *F21W 107/30* | (2018.01) |
| *F21W 103/15* | (2018.01) |

(52) U.S. Cl.
CPC .............. *F21S 43/31* (2018.01); *B64D 47/06* (2013.01); *F21V 7/048* (2013.01); *F21V 7/07* (2013.01); *F21W 2103/15* (2018.01); *F21W 2107/30* (2018.01)

(58) Field of Classification Search
CPC . F21S 43/31; F21V 7/07; F21V 7/048; B64D 47/06
USPC .......................................................... 362/470
See application file for complete search history.

(56) References Cited

U.S. PATENT DOCUMENTS

| 10,150,575 B2 | 12/2018 | Franich | |
|---|---|---|---|
| 2006/0007012 A1* | 1/2006 | Machi | H05B 47/235 340/815.45 |
| 2006/0209541 A1* | 9/2006 | Peck | F21V 7/04 362/247 |
| 2012/0273812 A1* | 11/2012 | Takahashi | F21K 9/23 257/88 |
| 2013/0128570 A1* | 5/2013 | Jiang | F21V 5/04 362/235 |
| 2019/0144131 A1* | 5/2019 | Jha | F21V 13/04 362/470 |

* cited by examiner

*Primary Examiner* — Christopher M Raabe
(74) *Attorney, Agent, or Firm* — Suiter Swantz pc llo

(57) ABSTRACT

A vehicle anti-collision light is disclosed. In one or more embodiments, the vehicle anti-collision light includes one or more illumination sources disposed on a substrate, and a reflector assembly coupled to the substrate at a base. In embodiments, the reflector assembly includes a reflective element including one or more reflective surfaces configured to redirect a first portion of illumination, and one or more transmissive portions configured to transmit a second portion of illumination through the reflective element. In embodiments, the one or more transmissive portions are bounded within the one or more reflective surfaces of the reflective element such that the reflective element includes one or more reflective surfaces between the base and the one or more transmissive portions, and one or more reflective surfaces between the one or more transmissive portions and a distal edge of the reflective element.

13 Claims, 12 Drawing Sheets

MULTIFACETED DISCONTINUOUS REFLECTOR

BACKGROUND

Vehicles often use high-intensity anti-collision lights to alert nearby observers of the vehicle's presence in order to reduce the likelihood of a collision. In the context of aviation, specific regulations define light intensity requirements. For example, according to Federal Aviation Administration (FAA) regulation codified at 14 C.F.R. 25.1401, aircraft anti-collision lights must direct light 360° about a horizontal plane, and up to 75° above the horizontal plane. Additionally, the regulation requires higher light intensities at lower vertical angles with respect to the horizontal plane and lower light intensities at higher vertical angles.

Currently available anti-collision lights exhibit several shortcomings. For example, currently available anti-collision lights typically emit large quantities of light at higher angles with respect to a horizontal plane. These large quantities of light are often far above light intensity requirements provided by regulating entities (e.g., FAA), and may therefore be considered as wasted light. Additionally, currently available anti-collision lights require multiple sets of illumination sources disposed on multiple surfaces in order to comply with respective regulations. These designs increase the cost, weight, and aerodynamic profile of the lights, as well as increase the complexity and probability of malfunctions.

Therefore, it would be desirable to provide a system and method that cure one or more of the shortfalls of the previous approaches identified above.

SUMMARY

A vehicle anti-collision light is disclosed. In one or more embodiments, the vehicle anti-collision light includes one or more illumination sources disposed on a substrate, and a reflector assembly coupled to the substrate at a base. In embodiments, the reflector assembly includes a reflective element including one or more reflective surfaces configured to redirect a first portion of illumination, and one or more transmissive portions configured to transmit a second portion of illumination through the reflective element. In embodiments, the one or more transmissive portions are bounded within the one or more reflective surfaces of the reflective element such that the reflective element includes one or more reflective surfaces between the base and the one or more transmissive portions, and one or more reflective surfaces between the one or more transmissive portions and a distal edge of the reflective element.

A vehicle anti-collision light for optimizing angular light distribution is disclosed. In one or more embodiments, the vehicle anti-collision light includes a substrate, a plurality of illumination sources disposed on the substrate, and a reflector assembly coupled to the substrate. In embodiments, the reflector assembly includes a reflective element coupled to the substrate at a base proximate to the plurality of illumination sources. In further embodiments, the reflective element includes one or more reflective surfaces configured to receive illumination generated by the plurality of illumination sources, redirect a first portion of the generated illumination, and one or more transmissive portions disposed within the reflective element between the base a distal edge of the reflective element, wherein the one or more transmissive portions are bounded by the one or more reflective surfaces, the one or more transmissive portions configured to transmit a second portion of illumination through the reflector assembly.

A method of distributing light to alert observers of the presence of a vehicle is disclosed. In one or more embodiments, the method includes: generating illumination with a plurality of illumination sources coupled to a substrate disposed on the vehicle; redirecting, with a reflective element of a reflector assembly coupled to the substrate, a first portion of the generated illumination across a first set of vertical angles relative to a substrate plane; and transmitting, with one or more transmissive portions disposed within the reflective element, a second portion of the generated illumination through the reflector assembly across a second set of vertical angles relative to the substrate plane, wherein at least one angle of the second set of vertical angles is greater than the first set of vertical angles, wherein the one or more transmissive portions are bounded within the reflective element.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
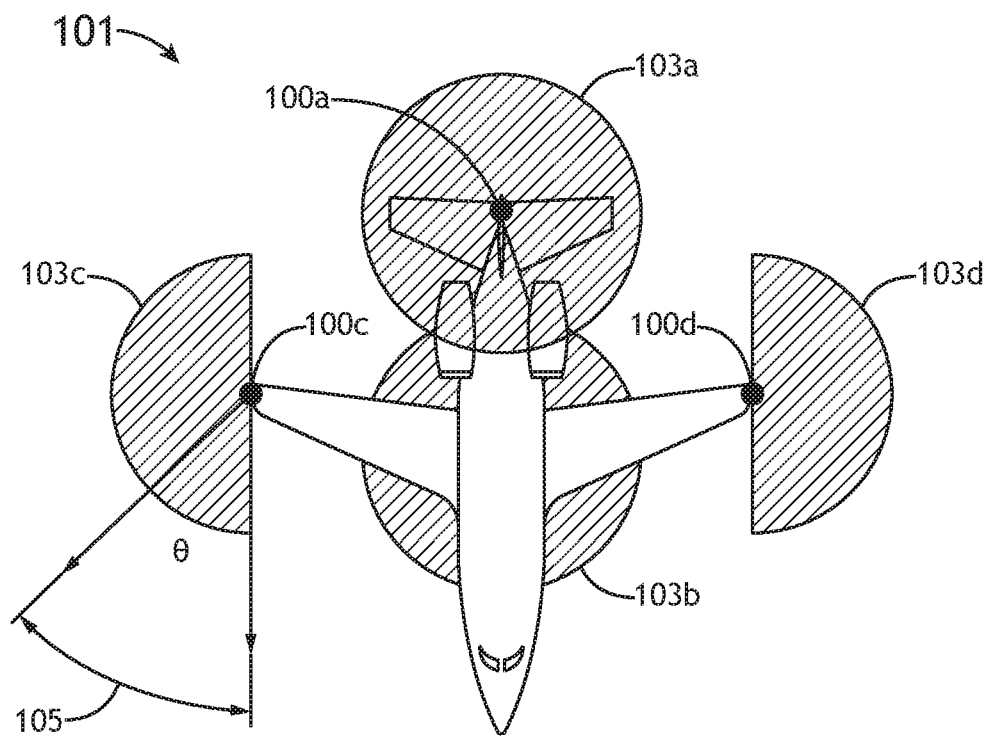
FIG. 1A illustrates a top view of an aircraft including multiple anti-collision lights, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Vehicles often use high-intensity anti-collision lights to alert nearby observers of the vehicle's presence in order to reduce the likelihood of a collision. In the context of aviation, specific regulations define light intensity requirements. For example, according to Federal Aviation Administration (FAA) regulation codified at 14 C.F.R. 25.1401, aircraft anti-collision lights must direct light 360° about a horizontal plane, and up to 75° above the horizontal plane. Additionally, the regulation requires higher light intensity at lower angles with respect to the horizontal plane as compared to the light intensity requirements at higher angles.

Currently available anti-collision lights exhibit several shortcomings. For example, currently available anti-collision lights typically emit large quantities of light at higher angles with respect to a horizontal plane. These large quantities of light are often far above light intensity requirements provided by regulating bodies (e.g., FAA), and may therefore be considered as wasted light. Additionally, currently available anti-collision lights require multiple sets of illumination sources disposed on multiple surfaces in order to comply with respective regulations. These designs increase the cost, weight, and aerodynamic profile of the lights, as well as increase the complexity and probability of malfunctions.

Accordingly, embodiments of the present disclosure are directed at an anti-collision light and method which cure one or more of the shortfalls of the previous approaches identified above. Embodiments of the present disclosure are directed to an anti-collision light with a discontinuous reflector assembly configured to optimize angular light distribution. In particular, embodiments of the present disclosure are directed to a reflector assembly including one or more transmissive portions configured to transmit light through the reflector assembly at high angles relative to a horizontal plane.

Figure 1B:
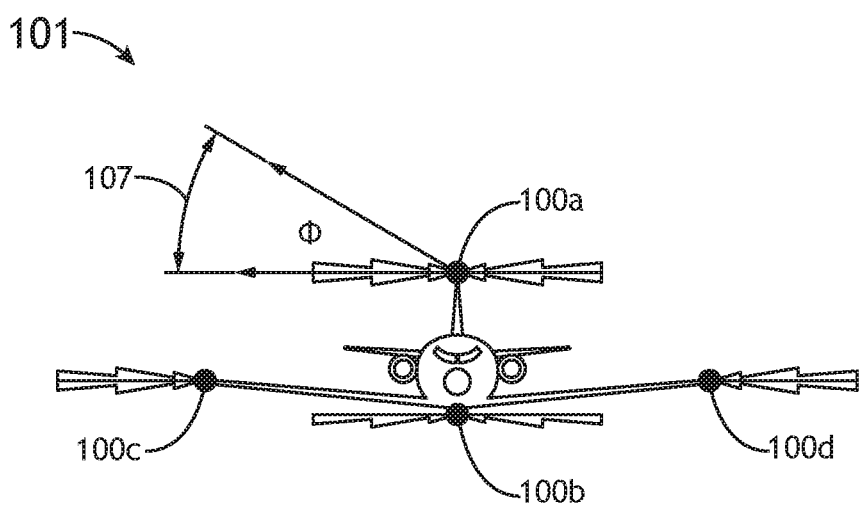
FIG. 1B illustrates a front profile view of an aircraft including multiple anti-collision lights, in accordance with one or more embodiments of the present disclosure.

FIG. 1A illustrates a top view of an aircraft 101 including multiple anti-collision lights 100, in accordance with one or more embodiments of the present disclosure. FIG. 1B illustrates a front profile view of an aircraft 101 including multiple anti-collision lights 100, in accordance with one or more embodiments of the present disclosure.

An aircraft 101 may include one or more anti-collision lights 100 which are configured to alert observers and/or surrounding aircraft as to the presence of the aircraft 101. For example, as shown in FIGS. 1A-1B, an aircraft 101 may include a first anti-collision light 100a disposed on the tail of the aircraft 101, a second anti-collision light 100b disposed on a lower surface of a fuselage of the aircraft 101, and third and fourth anti-collision lights 100c, 100d disposed on the wings of the aircraft 101. It is noted herein that additional and/or alternative anti-collision lights 100 may be used without departing from the spirit or scope of the present disclosure. For example, aircraft 101 may include an anti-collision light 100 disposed on an upper surface of the fuselage of the aircraft 101.

In embodiments, the one or more anti-collision lights 100 are configured to emit light across an illumination field of view 103. An illumination field of view 103 may be defined as a plurality of horizontal and vertical angles through which an anti-collision light 100 emits illumination. In this regard, an illumination field of view 103 may be defined by a lateral angle ($\theta$) 105 and a vertical angle ($\varphi$) 107. For example, as shown in FIGS. 1A-1B anti-collision light 100c may be configured to emit light across an illumination field of view 103c. In this example, the illumination field of view 103c is defined by a 180° lateral angle 105. By way of another example, anti-collision light 100a may be configured to emit light across an illumination field of view 103a, wherein the illumination field of view 103a is defined by a 360° lateral angle 105. By way of another example, as shown in FIG. 1B, anti-collision light 100a may be configured to emit light across an illumination field of view 103a, wherein the illumination field of view 103a is defined by a 180° vertical angle (φ) 107. It is noted herein that some embodiments of the present disclosure are directed toward anti-collision lights 100 which are configured to provide illumination for a single hemisphere (e.g., upper hemisphere, lower hemisphere). However, this is not to be regarded as a limitation of the present disclosure, unless noted otherwise herein.

It is contemplated herein that the anti-collision lights 100 of the present disclosure may be utilized by any aircraft known in the art including, but not limited to, jet aircraft, commercial aircraft, military aircraft, and the like. It is further contemplated herein that embodiments of the present disclosure may be implemented in contexts other than aviation. For example, an anti-collision light 100 of the present disclosure may be implemented on other airborne vehicles (e.g., helicopters), land-based vehicles (e.g., automobiles, motorcycles, military vehicles), aquatic vehicles (e.g., passenger boats, commercial ships, military vessels), and the like. Furthermore, an anti-collision light 100 of the present disclosure may be implemented in the context of stationary objects/structures in order to reduce the likelihood of collision with the stationary objects/structures.

As noted previously herein, regulations enacted by the FAA and other governing entities may define particular light intensity requirements as a function of both lateral angles 105 and vertical angles 107. For example, 14 C.F.R. 25.1401 requires aircraft anti-collision lights to direct light 360° about a horizontal plane (e.g., 360° lateral angle 105), and up to 75° above the horizontal plane (e.g., 0-75° vertical angle 107). Additionally, the regulation requires higher light intensity at lower vertical angles 107 with respect to the horizontal plane as compared to the light intensity requirements at higher vertical angles 107. Minimum effective intensities for varying vertical angles 107 are defined by 14 C.F.R. 25.1401 and summarized in Table 1 below:

| Angle Above or Below the Horizontal Plane | Effective Intensity (candles) |
| --- | --- |
| 0° to 5° | 400 |
| 5° to 10° | 240 |
| 10° to 20° | 80 |
| 20° to 30° | 40 |
| 30° to 75° | 20 |

Figure 2:
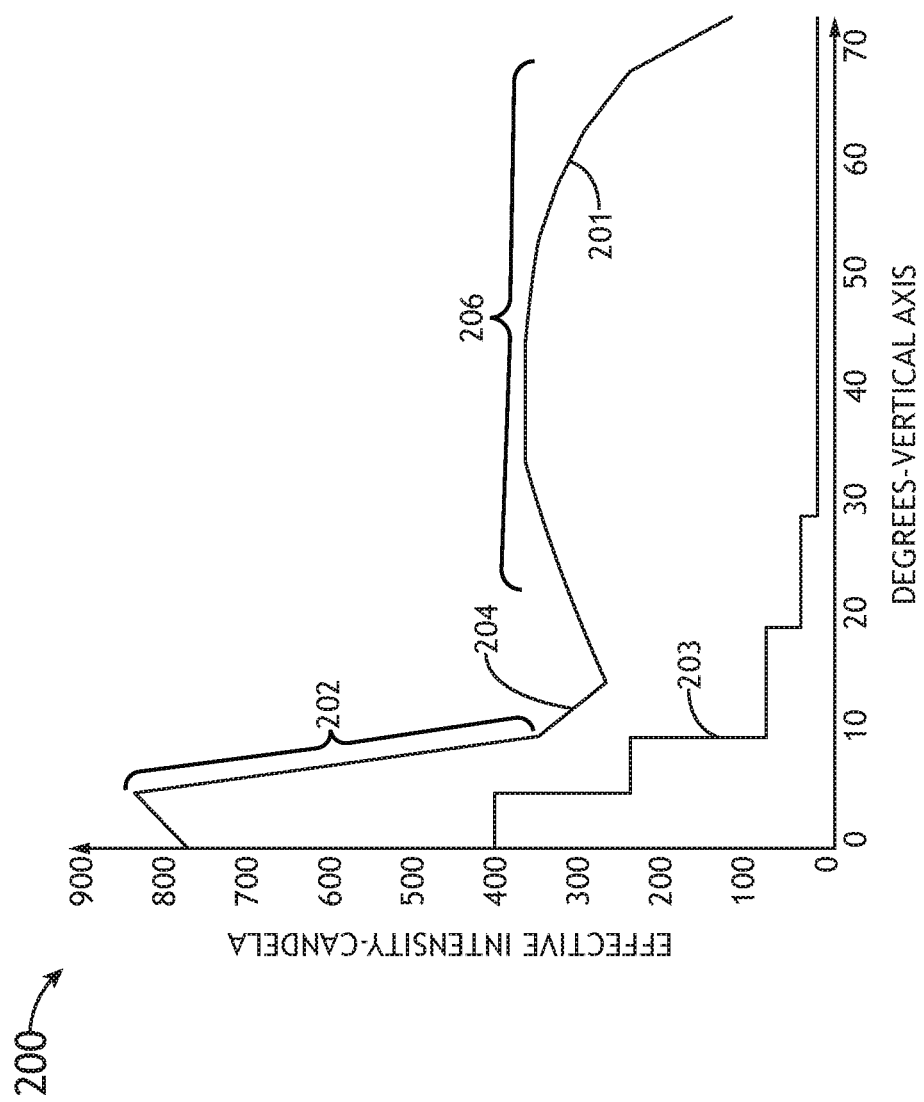
FIG. 2 is a graph illustrating the light intensity distribution of a traditional anti-collision lights.

Minimum effective intensity requirements may be further understood with reference to FIG. 2.

FIG. 2 is a graph 200 illustrating the light intensity distribution of a traditional anti-collision light. More particularly, graph 200 illustrates a light intensity curve 201 of a traditional anti-collision light as compared to FAA light intensity requirements codified at 14 C.F.R. 25.1401 and illustrated by regulatory curve 203. As noted previously herein and illustrated by regulatory curve 203, regulatory entities typically require higher light intensities along a horizontal plane (e.g., small vertical angles 107), and lower light intensities as you move further from the horizontal plane (e.g., large vertical angles 107).

Region 202 of light intensity curve 201 is typically attributable to light reflected/redirected by a traditional anti-collision light. Comparatively, region 206 of light intensity curve 201 is typically attributable to direct light which is emitted and uncaptured by the traditional anti-collision light. Transition region 204 represents a transition region including both captured and uncaptured light. As shown in FIG. 2, light intensities in the transition region 204 dip down and approach the regulatory curve 203, indicating that traditional anti-collision lights provide only marginally more light intensity than is required in the vertical angle 107 range of approximately 10-15°. Conversely, region 206 is well above the regulatory curve 203, indicating that traditional anti-collision lights provide far excess light intensity than is required in the vertical angle 107 range of approximately 15-75°.

The light emitted at large vertical angles 107 which is far above what is required (e.g., far above regulatory curve 203) is considered to be wasted light. Additionally, due to the degradation of lights over time, traditional anti-collision lights often decline in performance and dip below the regulatory curve 203 within the transition region 204. In this regard, embodiments of the present disclosure are directed at an anti-collision light 100 which optimizes angular distribution of light in order to ensure and maintain optical performance which is in compliance with all applicable regulatory entities. In particular, embodiments of the present disclosure are directed to an anti-collision light 100 which focuses some of the light from high vertical angles 107 (e.g., region 206) into lower vertical angles 107 (e.g., region 202 and transition region 204) in order to ensure compliance with applicable regulatory entities.

Figure 3:
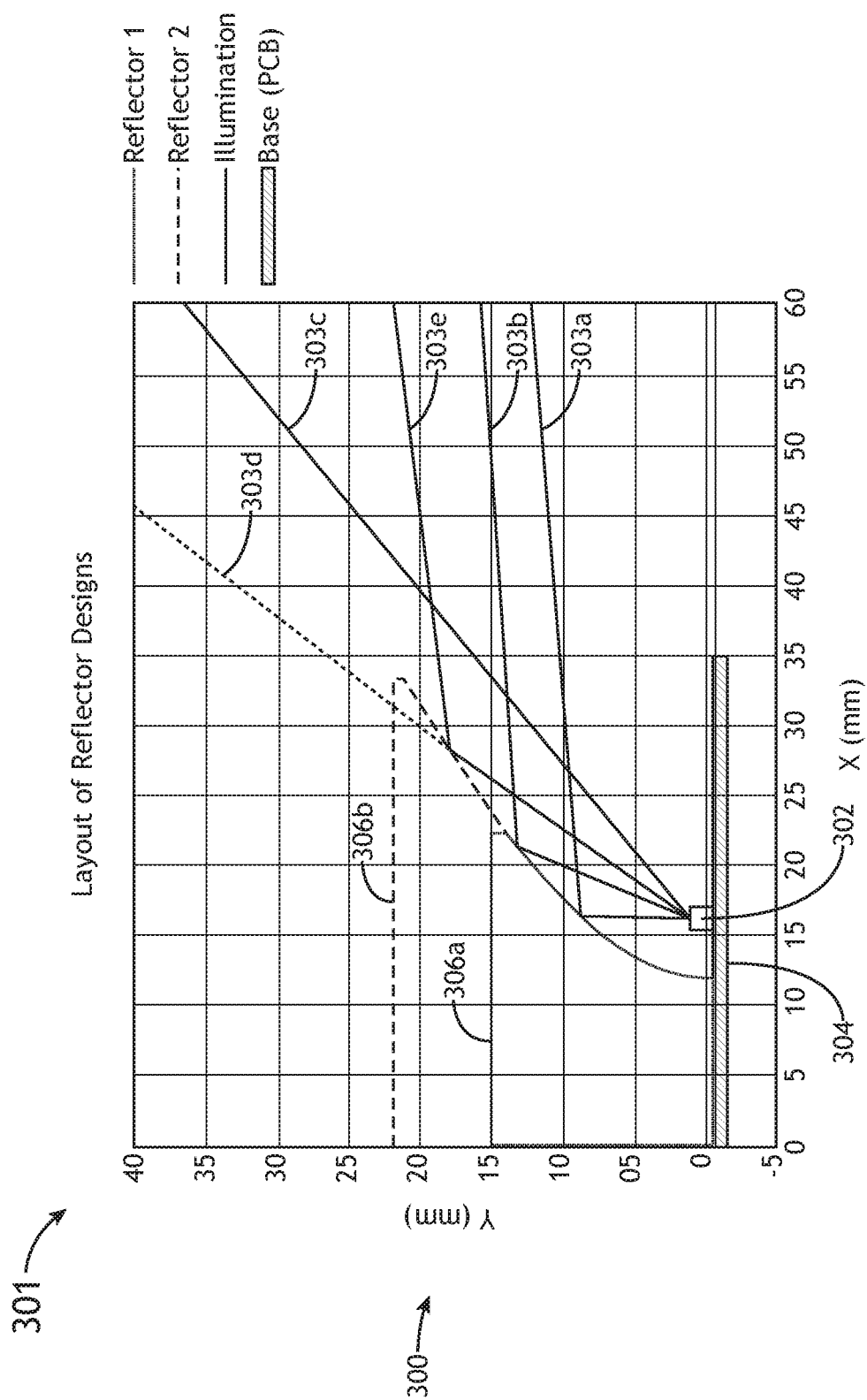
FIG. 3 illustrates a graph of an angular light distribution profile of a traditional anti-collision light.

FIG. 3 illustrates a graph 301 of an angular light distribution profile of a traditional anti-collision light 300.

As shown in FIG. 3, a traditional anti-collision light 300 may include an illumination source 302 disposed on a substrate 304 and a reflector assembly 306a. During operation, the illumination source 302 may emit one or more illumination beams 303a-303n. Dependent upon the emission angle of the light beams 303, some illumination beams 303 may be captured and redirected by the reflector assembly 306a, and other illumination beams 303 may be emitted directly such that they are not captured by the reflector assembly 306a. For instance, illumination beams 303a and 303b are captured and redirected by the reflector assembly 306a (region 202 in FIG. 2), and illumination beams 303c and 303d are uncaptured and emitted directly by the reflector assembly 306a (region 206 in FIG. 2).

In order to decrease the amount of light which passes directly/uncaptured by the reflector assembly 306a at high vertical angles (region 206 in FIG. 2), previous attempts have been made to extend the reflector assembly 306a such that an extended reflector assembly 306b extends above and further beyond the illumination sources 302. For example, extending reflector assembly 306a may be represented in FIG. 3 as extended reflector assembly 306b. As shown in FIG. 3, illumination beam 303d, which was captured and redirected by the shorter reflector assembly 306a, may now be captured and redirected by the extended reflector assembly 306b, which is illustrated by redirected illumination beam 303e.

In practice, redirecting previously uncaptured illumination may serve to lower the light intensity curve 201 in region 206, and raise the light intensity curve 201 in region 202 and/or transition region 204. However, redirecting previously uncaptured illumination by extending the reflector assembly 306 has typically resulted in cutting off illumination emitted at high vertical angles 107. This often results in traditional anti-collision lights with extended reflector assemblies 306 (e.g., extended reflector assembly 306b)

failing to meet light intensity requirements at high vertical angles 107. This may be better understood with reference to FIG. 4.

Figure 4:
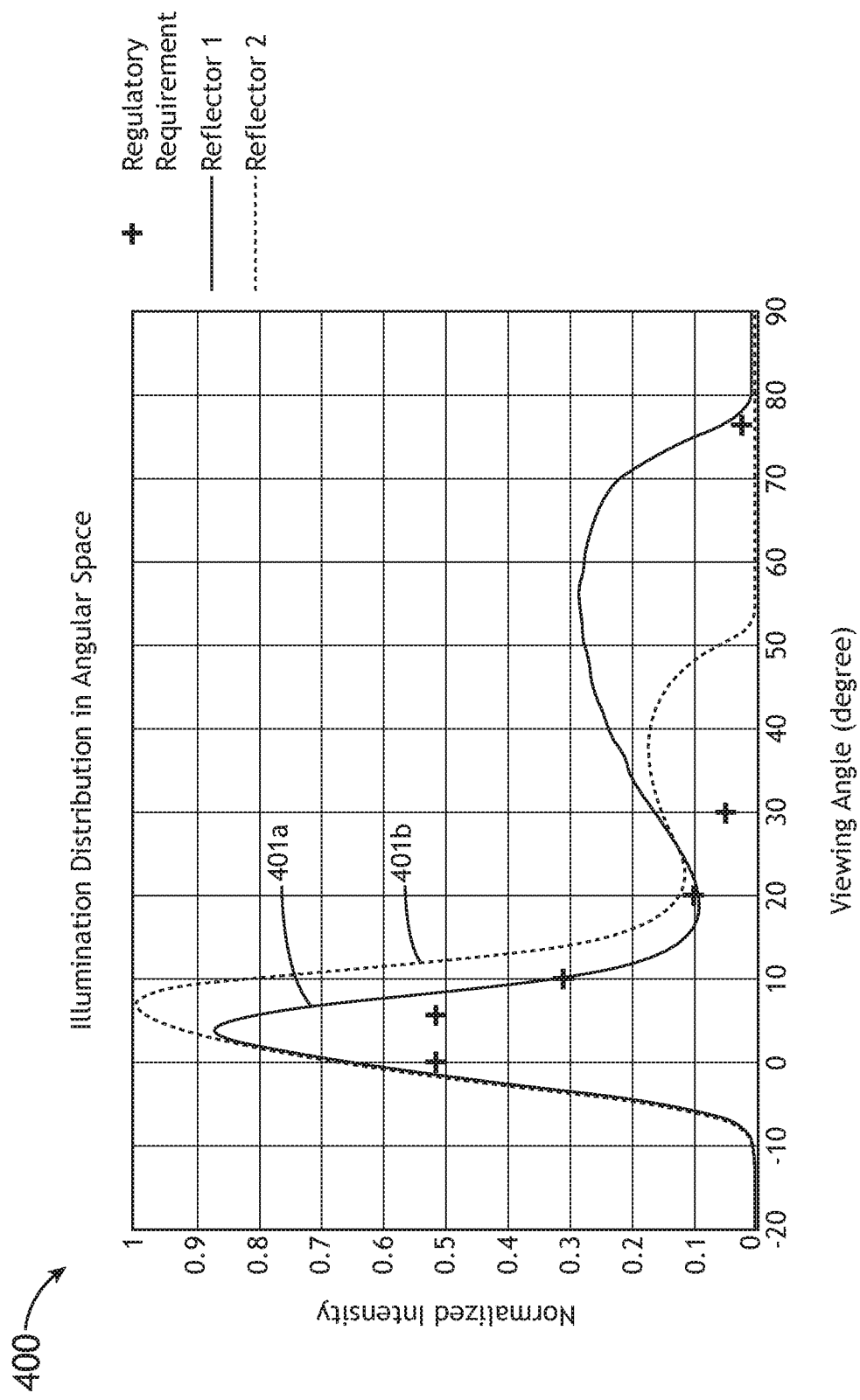
FIG. 4 is a graph illustrating the light intensity distribution of traditional anti-collision lights.

FIG. 4 is a graph 400 illustrating the light intensity distribution of traditional anti-collision lights. In particular, graph 400 illustrates a light intensity curve 401a achieved by the shorter reflector assembly 306a, and a light intensity curve 401b achieved by the extended reflector assembly 306b.

Comparing the light intensity curve 401a to the regulatory requirements in graph 400, it may be seen that the shorter reflector assembly 306a narrowly exceeds the regulatory requirements at vertical angles 107 between 10° and 15°, while far exceeding the regulatory requirements at vertical angles 107 between 20° and 75°. In an attempt to improve light intensity within the transition region 204 (e.g., vertical angles 107 between approximately 10-15°), previous attempts to utilize an extended reflector assembly 306b have resulted in the light intensity curve 401b. As may be seen in graph 400, the extended reflector assembly 306b may succeed in improving light intensity within the transition region 204 (e.g., vertical angles 107 between approximately 10-15°). However, light intensity curve 401b drops below the regulatory requirements at high vertical angles 107. Specifically, the extended reflector assembly 306b cuts off direct illumination at high viewing angles 107, resulting in light intensity curve 401b to drop below the regulatory requirement at a vertical angle 107 of 75°, indicating the extended reflector assembly 306b fails to meet all regulatory requirements across the required vertical angle 107 spectrum.

Figure 5A:
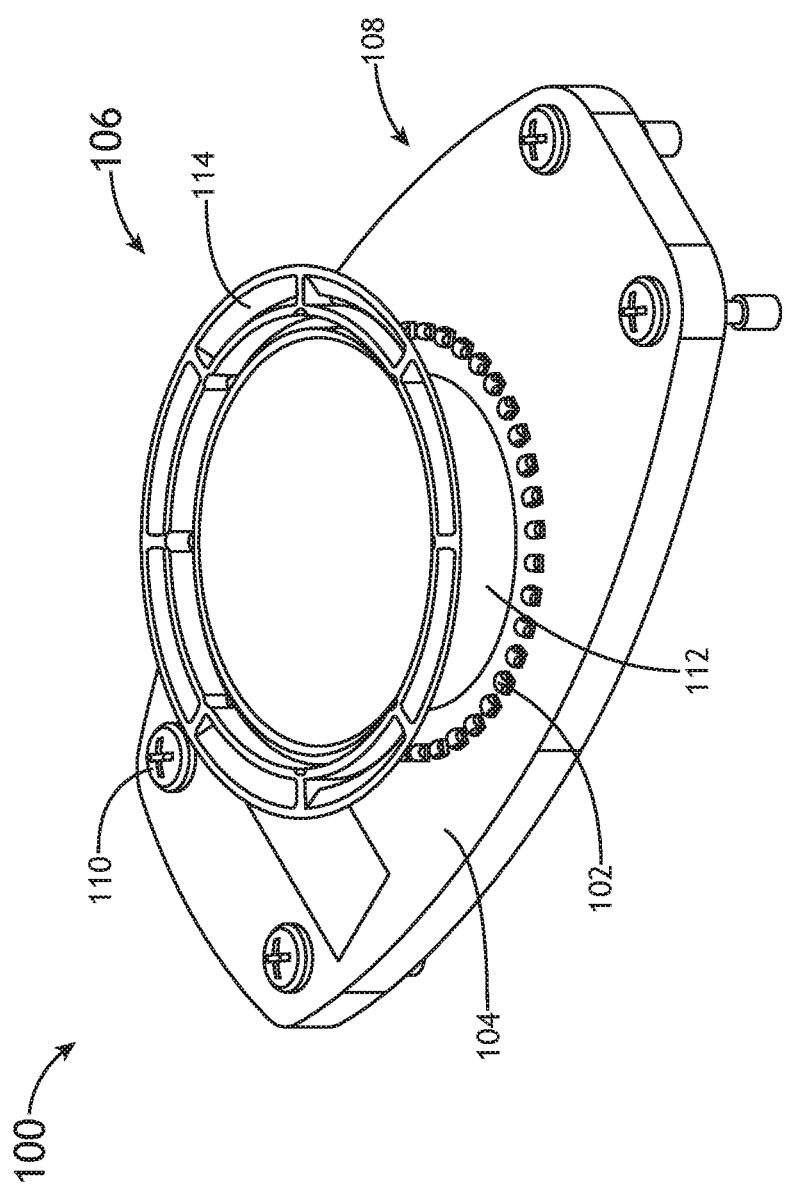
FIG. 5A illustrates a perspective view of an anti-collision light, in accordance with one or more embodiments of the present disclosure.

Accordingly, embodiments of the present disclosure are directed to an anti-collision light 100 with a discontinuous reflector assembly configured to optimize angular distribution of light in order to ensure and maintain optical performance which is in compliance with all applicable regulatory entities FIG. 5A illustrates a perspective view of a vehicle anti-collision light 100, in accordance with one or more embodiments of the present disclosure. In embodiments, the vehicle anti-collision light 100 may include, but is not limited to, one or more illumination sources 102 disposed on a substrate 104, a reflector assembly 106, electronic circuitry (not shown), and one or more attachment assemblies 110 configured to couple the vehicle anti-collision light 100 to a vehicle (e.g., aircraft 101). In embodiments, the reflector assembly 106 may include a reflective element 112 including one or more reflective surfaces, and one or more transmissive portions 114.

In embodiments, the vehicle anti-collision light 100 includes one or more illumination sources 102 disposed on a substrate 104. The one or more illumination sources 102 may include any illumination sources known in the art including, but not limited to, light emitting diodes (LEDs). Similarly, the substrate 104 may include any substrate known in the art configured to receive the illumination sources 102, electronic circuitry (not shown), reflector assembly 106, and the like. For example, the substrate 104 may include, but is not limited to, a printed circuit board (PCB). In embodiments, the electronic circuitry may include any electronic device or circuit known in the art configured to facilitate operation of the one or more illumination sources 102.

It is contemplated herein that the illumination sources 102 may be arranged and operated in such a manner as to optimize optical performance, and reduce optical degradation in the event of a failure of a single illumination source 102. For example, as shown in FIG. 5A, the one or more illumination sources 102 may be disposed on the substrate 104 evenly, such that the illumination sources 102 are placed at regular intervals and distances between each illumination source 102 are equivalent. It is contemplated herein that such uniform spacing between illumination sources 102 may serve to preserve optical performance of the vehicle anti-collision light 100 in the event a single illumination source 102 (e.g., single LED) goes out or malfunctions. Additionally, the illumination sources 102 may be wired in conjunction with the electronic circuitry (not shown) such that the failure of one illumination source 102 will not negatively affect various other illumination sources 102n. For example, the plurality of illumination sources 102 may be wired in parallel and/or within two or more separate electrical circuits such that the failure/malfunction of one illumination source 102 will not materially degrade the optical performance of the anti-collision light 100 as a whole.

In embodiments, one or more illumination sources 102 may be configured to generate illumination. In some embodiments, the one or more illumination sources 102 may be disposed/coupled to the substrate 104 in specified orientations configured to facilitate desired illumination field of views 103. For example, the one or more illumination sources 102 may be disposed on the substrate 104 in a closed curve configuration. The closed curve may include any closed curve known in the art including, but not limited to, a circle, oval, ellipse, polygon (e.g., triangle, square, rectangle), and the like. For instance, as shown in FIG. 5A, the one or more illumination sources 102 may be disposed on the substrate 102 in a circular closed curve configuration. In this regard, in some embodiments, the one or more illumination sources 102 may be disposed on the substrate such that the illumination sources 102 are rotationally symmetric with respect to a vertical axis normal to the substrate 104 (e.g., vertical axis normal to a horizontal/substrate plane 109 defined by the substrate 104).

In additional and/or alternative embodiments, the one or more illumination sources 102 may be disposed on the substrate 104 in configurations other than a closed curve. For example, in some embodiments, the illumination sources 102 may be disposed on the substrate 104 in a straight line, a 90° arc, a 180° arc, and the like. It is contemplated herein that disposing the illumination sources 102 in particular configurations may facilitate the transmission of light along desired illumination fields of view 103. For example, where a 360° lateral illumination field of view 103 is desired, the one or more illumination sources 102 may be configured in a closed curve configuration, as shown in FIG. 5A. Comparatively, where a 180° lateral illumination field of view 103 is desired, the one or more illumination sources 102 may be configured in a 180° open arc configuration.

In embodiments, the reflector assembly 106 may be coupled to the substrate 104 proximate to the one or more illumination sources 102. In embodiments where the illumination sources 102 are configured in a closed curve, the reflector assembly 106 may be coupled to the substrate 104 within an enclosed region of the closed curve. For example, as shown in FIG. 5A, the illumination sources 102 may be arranged in a circular closed curve configuration, and the reflector assembly 106 may be coupled to the substrate 104 within the enclosed region of the circular closed curve. In some embodiments, the reflector assembly 106 may be shaped to correspond to a shape of the configuration of the illumination sources 102. For example, as shown in FIG. 5A, the reflector assembly 106 may include a circular reflector assembly 106 to correspond to the circular closed curve configuration of the illumination sources 102. In this regard, the reflective element 112 of the reflector assembly 106 may include a rotationally symmetric reflective element 112.

In some embodiments, a circular reflector assembly 106 may be coupled to the substrate 104 such that the circular reflector assembly 106 is concentric with the circular closed loop configuration of the illumination sources 102. For example, as shown in FIG. 5A, the illumination sources 102 may be arranged in a circular closed loop configuration, and the reflector assembly 106 may be circular and disposed on the substrate 104 such that the center of the circular closed loop is also the center of the reflector assembly 112/reflective element 112, and a diameter of the reflective element 112 is less than the diameter of the circular closed loop. The arrangement and shape of the illumination sources 102 and reflector assembly 106 is described in further detail by David Franich et al. in U.S. Pat. No. 10,150,575, entitled AIRCRAFT ANTI-COLLISION LIGHT, filed on Mar. 17, 2016, which is incorporated herein by reference in the entirety.

As contemplated previously herein, the reflector assembly 106 may be configured to distribute illumination 360° about an axis normal to the substrate 104. In this regard, the reflector assembly 106 may be configured to distribute illumination 360° with respect to a horizontal plane defined by the substrate 104 such that the lateral angle (θ) 105 defining a lateral range of the illumination field of view 103 of the anti-collision light 100 is 360°. It is contemplated herein that the circular configuration shown and described with respect to FIG. 5A may facilitate efficient distribution of illumination across a 360° lateral angle 105. However, it is recognized herein that other configurations may be possible, and the circular/rotationally symmetric configuration shown and described is not to be regarded as limiting, unless noted otherwise herein.

Figure 5B:
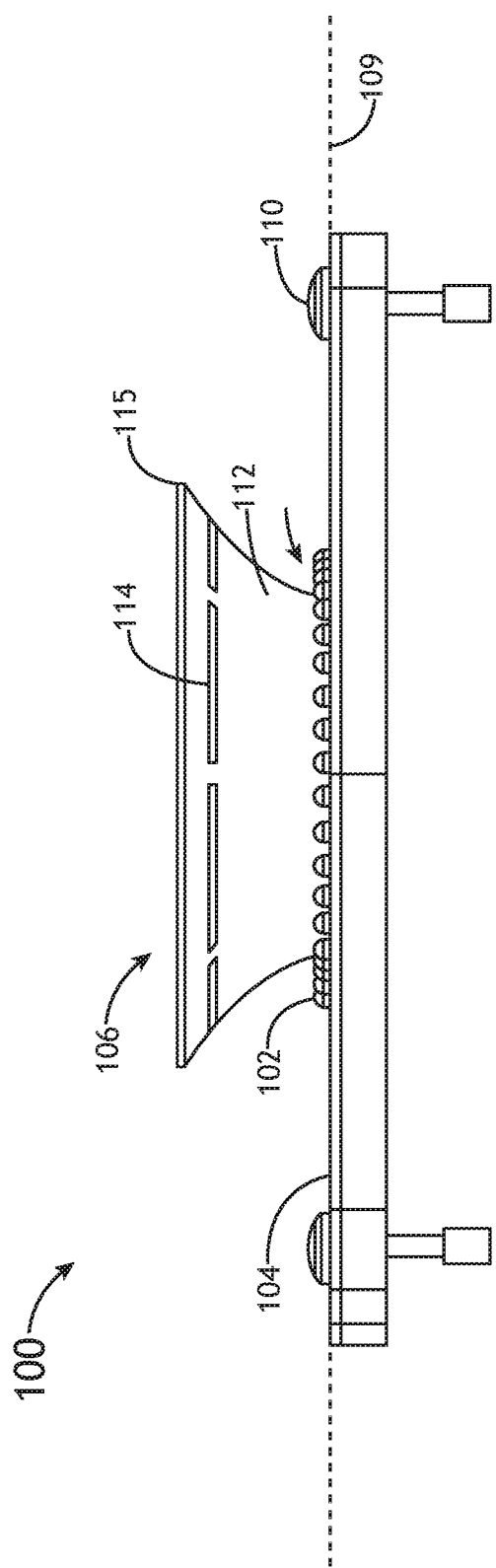
FIG. 5B illustrates a side profile view of an anti-collision light, in accordance with one or more embodiments of the present disclosure.

FIG. 5B illustrates a side profile view of an anti-collision light 100, in accordance with one or more embodiments of the present disclosure.

In embodiments, the one or more illumination sources 102 are configured to generate illumination and direct illumination upwards from a horizontal plane (e.g., substrate plane 109) defined by the substrate 104. A reflector assembly 106 may be coupled to the substrate 104 at a base 113 proximate to the illumination sources 102. In embodiments, the reflector assembly 106 may include a reflective element 112 and one or more transmissive portions 114 disposed within the reflective element 112. The one or more transmissive portions 114 may be disposed within the reflective element 112 between the base 113 and a distal edge 115 of the reflector assembly 106/reflective element 112. In this regard, the reflector assembly 106 may be said to be "discontinuous" in that the one or more reflective surfaces of the reflective element 112 may be interrupted by one or more transmissive portions 114.

In embodiments, the reflective element 112 of the reflector assembly 106 is configured to collect and redirect at least a portion of the illumination generated by the one or more illumination sources 102. In this regard, the reflective element 112 may include a plurality of reflective surfaces. For example, the reflective element 112 of the reflector assembly 106 may include a multifaceted reflective element including a plurality of reflective surfaces configured to redirect received illumination. As noted previously herein, the reflective element 112 may be configured to redirect illumination generated by the illumination sources 102 along a plurality of low vertical angles 107. For instance, as shown in FIG. 2, the reflective element 112 may be configured to redirect illumination along a plurality of low vertical angles 107 illustrated in region 202.

In embodiments, the reflective element 112 of the reflector assembly 106 includes a frustro-conical reflective element 112. It is contemplated herein that the reflector assembly 106 may take up any shape known in the art configured to optimize an angular light distribution compliant with relevant regulatory entities. For example, in some embodiments, the reflective element 112 of the reflector assembly 106 may include a hyperbolic reflective element 112 (e.g., hyperbolic, frustro-conical reflective element 112). In this regard, a side profile of the reflective element 112, as shown in FIG. 5B, may be defined by a hyperbolic function. However, this is not to be regarded as a limitation of the present disclosure, unless noted otherwise herein. In this regard, a side profile of the reflective element 112 may be defined according to any equation known in the art including, but not limited to, a linear equation, a parabolic equation, a hyperbolic equation, a complex polynomial equation, and the like.

As noted previously, the reflective element 112 may be coupled to the substrate 104 within an enclosed region of the closed curve of the illumination sources 102. In some embodiments, the reflective element 112 may extend from the substrate 104 such that the reflective element 112 extends over at least a portion of the one or more illumination sources 102. For example, as shown in FIG. 5B, the hyperbolic reflective element 112 may be coupled to the substrate 104 at a base 113, and may extend upwards from a horizontal/substrate plane 109 of the substrate 104 such that the hyperbolic reflective element 112 extends over the one or more illumination sources 102. In this regard, where the reflective element 112 includes a circular reflective element 112 (e.g., rotationally symmetric reflective element 112), a diameter of the reflective element 112 at the base 113 may be smaller than a diameter of the reflective element 112 at the distal edge 115.

Figure 6B:
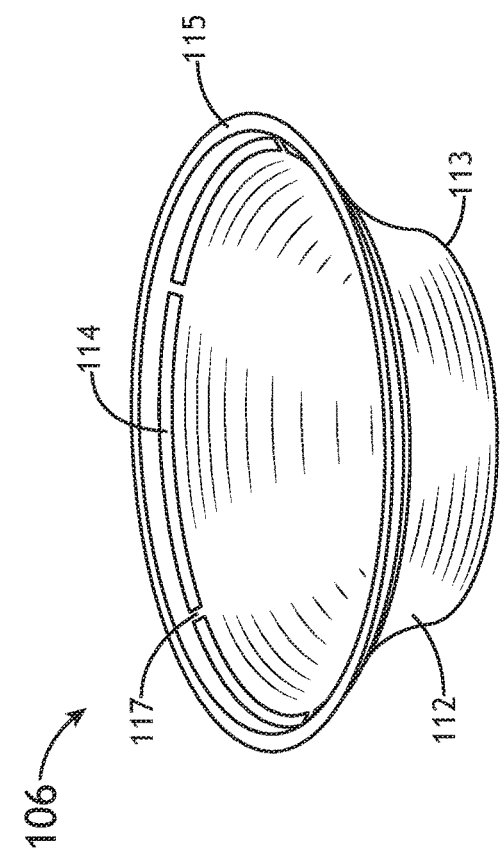
FIG. 6B illustrates a perspective view of a reflector assembly of an anti-collision light, in accordance with one or more embodiments of the present disclosure.
Figure 6A:
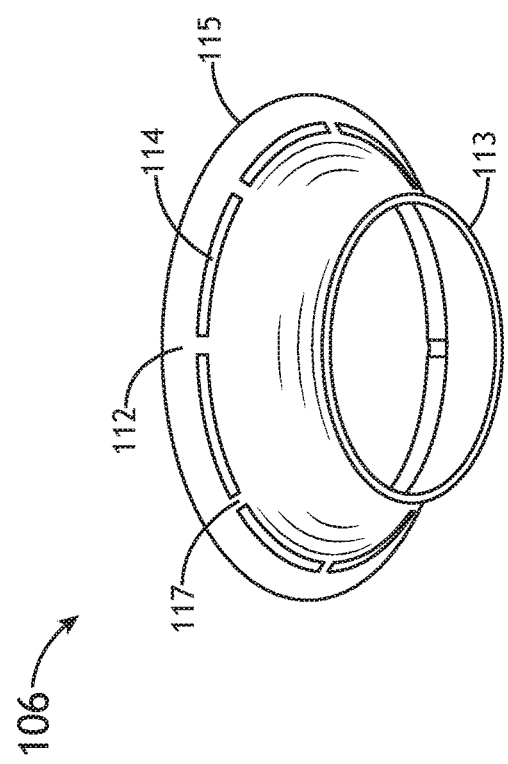
FIG. 6A illustrates a perspective view of a reflector assembly of an anti-collision light, in accordance with one or more embodiments of the present disclosure.
Figure 6C:
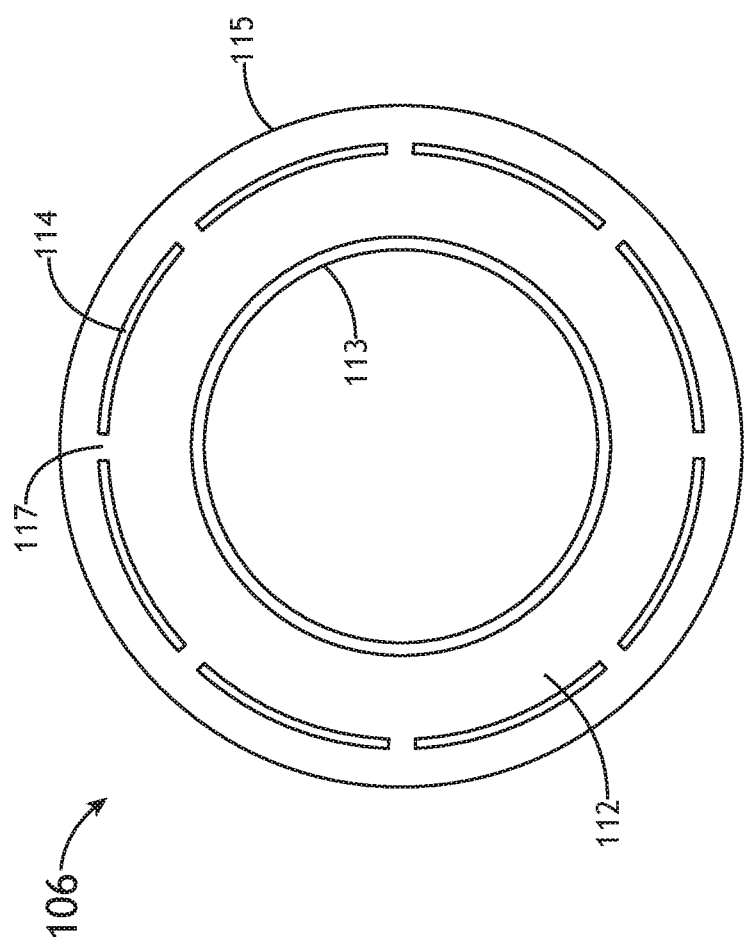
FIG. 6C illustrates a bottom view of a reflector assembly of an anti-collision light, in accordance with one or more embodiments of the present disclosure.

FIG. 6A illustrates a perspective view of a reflector assembly 106 of an anti-collision light 100, in accordance with one or more embodiments of the present disclosure. FIG. 6B illustrates a perspective view of a reflector assembly 106 of an anti-collision light 100, in accordance with one or more embodiments of the present disclosure. FIG. 6C illustrates a top view of a reflector assembly 106 of an anti-collision light 100, in accordance with one or more embodiments of the present disclosure.

In embodiments, as shown in FIGS. 5A-6C, the reflector assembly 106 may include one or more transmissive portions 114. In embodiments, the one or more transmissive portions 114 may be disposed within the reflective element 112 between the base 113 of the reflective element 112 and the distal edge 115 of the reflective element 112 such that the one or more transmissive portions 114 are bounded by the one or more reflective surfaces of the reflective element 112. In this regard, the reflective element 112 may include one or more reflective surfaces between the substrate plane 109 and the one or more transmissive portions 114 (e.g., below the transmissive portions 114), and may further include one or more additional reflective surfaces above the transmissive portions 114 such that the one or more transmissive portions 114 are disposed between the substrate plane 109 and the one or more additional reflective surfaces. In some embodiments, the one or more transmissive portions 114 may be completely bounded by the reflective element 112 such that each of the one or more transmissive portions 114 are surrounded on all sides by one or more reflective surfaces of the reflective element 112.

In embodiments, the one or more transmissive portions 114 of the reflector assembly 106 are configured to transmit at least a portion of illumination generated by the one or more illumination sources 102 through the reflective element 112/reflector assembly 106. It is contemplated herein that the one or more transmissive portions 114 may include any transmissive components, elements, or materials known in the art configured to transmit illumination through the reflective element 112. For example, the one or more transmissive portions 114 may include, but are not limited to, an aperture, a hole (e.g., air gap), a lens (e.g., Fresnel lens), transparent materials, and the like. For instance, the reflector assembly 106 may be fabricated using injection molding processes (e.g., double-shot injection molding process) in which the one or more transmissive portions 114 are injection molded using one or more transparent/transmissive materials (e.g., transparent plastic materials).

The one or more transmissive portions 114 may be configured to transmit illumination through the reflective element 112 at relatively high angles with respect to the substrate plane 109. In this regard, illumination transmitted via the transmissive portions 114 may emanate away from the anti-collision light 100 at higher vertical angles 107 as compared to illumination redirected by the reflective element 112. For instance, the reflective element 112 may be configured to redirect the first portion of illumination across a first set of vertical angles 107 relative to the substrate plane 109, and the one or more transmissive portions 114 may be configured to transmit a second portion of illumination across a second set of vertical angles 107 relative to the substrate plane 109, wherein at least one angle of the second set of vertical angles is greater than the first set of vertical angles. In additional and/or alternative embodiments, In some embodiments, each angle of the second set of vertical angles 107 may be greater than each angle of the first set of vertical angles 107, such that all illumination transmitted through the one or more transmissive portions 114 may be emitted from the anti-collision light 100 at a higher vertical angle 107 than illumination redirected by the reflective element 112.

In some embodiments, the one or more transmissive portions 114 include one or more slits, as shown in FIG. 5B. In additional embodiments, the one or more transmissive portions 114 may include horizontal transmissive portions 114 (e.g., horizontal slits) which are disposed within the reflective element 112 such that the horizontal transmissive portions 114 are oriented parallel to the substrate plane 109. For example, as shown in FIG. 5B, the one or more horizontal transmissive portions 114 (e.g., horizontal slits) may be oriented horizontally such that they are parallel with respect to the horizontal substrate plane 109.

In embodiments, the one or more transmissive portions 114 may be disposed within the reflective element 112 at regular intervals and/or uniform heights. For example, the one or more transmissive portions 114 may be disposed within the reflective element 114 at equivalent heights with respect to the base 113 and the distal edge 115, such that a first transmissive portion 114a and an additional transmissive portion 114b are disposed within the reflective element 112 a first distance away from the base 113 and a second distance away from the distal edge 115. In this regard, the one or more transmissive portions 114 may be disposed within the reflective element 114 along a line which is parallel and/or concentric with respect to the base 113 and the distal edge 115. In other embodiments, the one or more transmissive portions 114 may be disposed within the reflective element 112 such that the one or more transmissive portions 114 are distributed at regular intervals across the reflective element 112. For example, in embodiments with a circular reflective element 112 and four separate transmissive portions 114a, 114b, 114c, 114d, the transmissive portions 114a-114d may be spaced around the reflective element 112 such that centers of the transmissive portions 114a-114d are spaced 90° apart. Accordingly, the one or more transmissive elements 114 may be disposed within the reflective element 112 such that there are uniform distances between each adjacent transmissive portion 114.

It is contemplated herein that orienting the transmissive portions 114 horizontally (e.g., parallel to the substrate plane 109) may provide a number of advantages over various other orientations, including vertical slits which are oriented towards (e.g., normal, substantially normal) to the substrate plane 109. First, it is contemplated herein that horizontally oriented transmission portions 114 may be fabricated in a more efficient and cost-effective manner. Additionally, it is contemplated herein that bounding the transmissive portions 114 within the reflective surfaces of the reflector element 112 provide for improved durability, particularly in highly-dynamic environments, such as aircraft and aquatic vehicles. Furthermore, it is contemplated herein that horizontally oriented transmissive portions 114 bounded by the reflective element 114 provide for improved customization on a bespoke basis, allowing a manufacturer to more effectively tailor the illumination field of view 103 generated by the anti-collision light 100.

In embodiments, the reflective element 112 may include one or more connecting portions 117 configured to couple various portions of the reflective element 112 together. For example, as shown in FIGS. 6A-6B, the one or more transmissive portions 114 may result in a discontinuous reflective element 112, wherein a top portion and a bottom portion of the reflective element 112 are coupled together via one or more connecting portions 117. In some embodiments, the one or more connecting portions 117 may include one or more reflective surfaces. For example, as shown in FIG. 6A, the one or more connecting portions 117 may include one or more reflective surfaces such that the transmissive portions 114 are completely bounded (e.g., bounded on all sides) by one or more reflective surfaces of the reflective element 112.

It is noted herein that the reflective element 112 may be fabricated as a single structure, or as separate structures coupled via one or more connecting portions 117. For example, as shown in FIG. 6A, the reflective element 112 may be fabricated as a single structure, wherein one or more holes are cut from the reflective element 112 to create the transmissive portions 114. By way of another example, as shown in FIG. 6A, the reflective element 112 may be fabricated as a two separate structures, a base reflective element structure and a ring reflective element structure, wherein the base reflective element structure and a ring reflective element structure are coupled to one another via one or more connecting portions 117 to create a single reflective element 112.

Figure 6D:
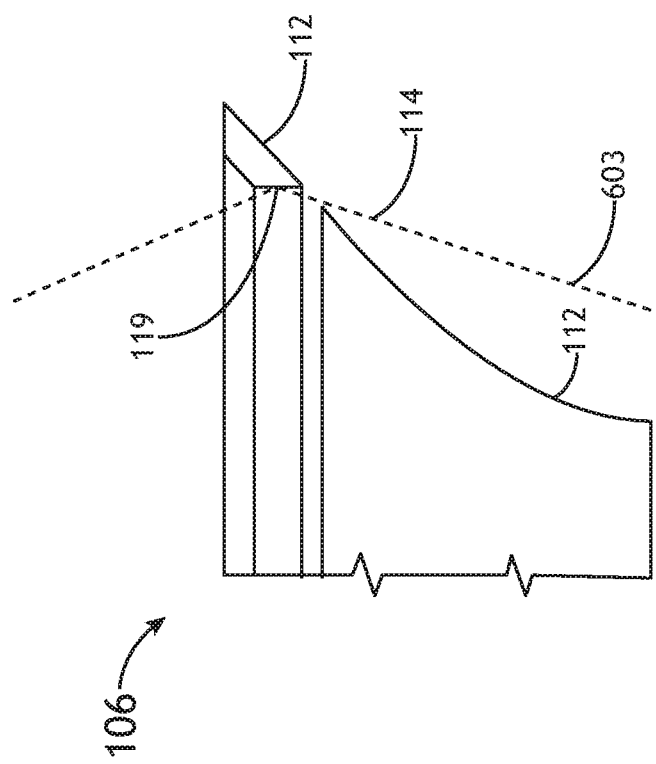
FIG. 6D illustrates a cross-sectional view of a portion of a reflector assembly of an anti-collision light, in accordance with one or more embodiments of the present disclosure.

FIG. 6D illustrates a cross-sectional view of a portion of a reflector assembly 106 of an anti-collision light 100, in accordance with one or more embodiments of the present disclosure.

In embodiments, one or more surfaces of the reflector assembly 106/reflective element 112 adjacent to the one or transmissive portions 114 include a reflective surface configured to redirect illumination being transmitted through the reflector element 106 via the one or more transmissive portions 114. In this regard, the one or more transmissive portions 114 may be regarded as including one or more reflective-transmissive surfaces. For example, as shown in FIG. 6D, the reflective element 112 may include a reflective surface 119 disposed on the reflective element 112 adjacent to a transmissive portion 114 such that the reflective surface 119 is configured to redirect some illumination beams 603 being transmitted through the reflector assembly 106 via the transmissive portion 114.

It is contemplated herein that the one or more reflective surfaces 119 adjacent to the transmissive portions 114 may be angled or otherwise oriented in order to further shape and tailor the illumination field of view 103 of the anti-collision light 100. For example, as shown in FIG. 6D, the reflective surface 119 may be oriented at an angle which is normal to the substrate plane 109. In this example, the reflective surface 119 may be configured to redirect illumination beams 603 transmitted through the reflector assembly 106 at vertical angles 107 greater than 90° above the horizontal substrate plane 109, as shown in FIG. 6D. By way of another example, the reflective surface 119 may be angled such that it is configured to redirect illumination beams 603 transmitted through the reflector assembly 106 at vertical angles 107 less than 90° above the horizontal substrate plane 109.

In addition to optical performance advantages, it is further contemplated herein that embodiments of the present disclosure illustrated in FIGS. 5A-6D may provide a number of additional advantages over prior approaches. For example, as opposed to prior approaches which have required multiple reflector assemblies and/or multiple sets of illumination sources disposed on multiple surfaces/substrates, the anti-collision light 100 of the present disclosure may be configured to meet regulatory requirements with only a single set of illumination sources 102 disposed on a single substrate 104 with a single reflector assembly 106. This simplified design may provide for a more cost-efficient and compact anti-collision light 100, with an improved aerodynamic profile. Additionally, the design of the present disclosure further reduces the amount of material, components, and weight of the anti-collision light 100, which may result in cost, performance, and durability advantages as compared to conventional anti-collision lights.

Figure 7:
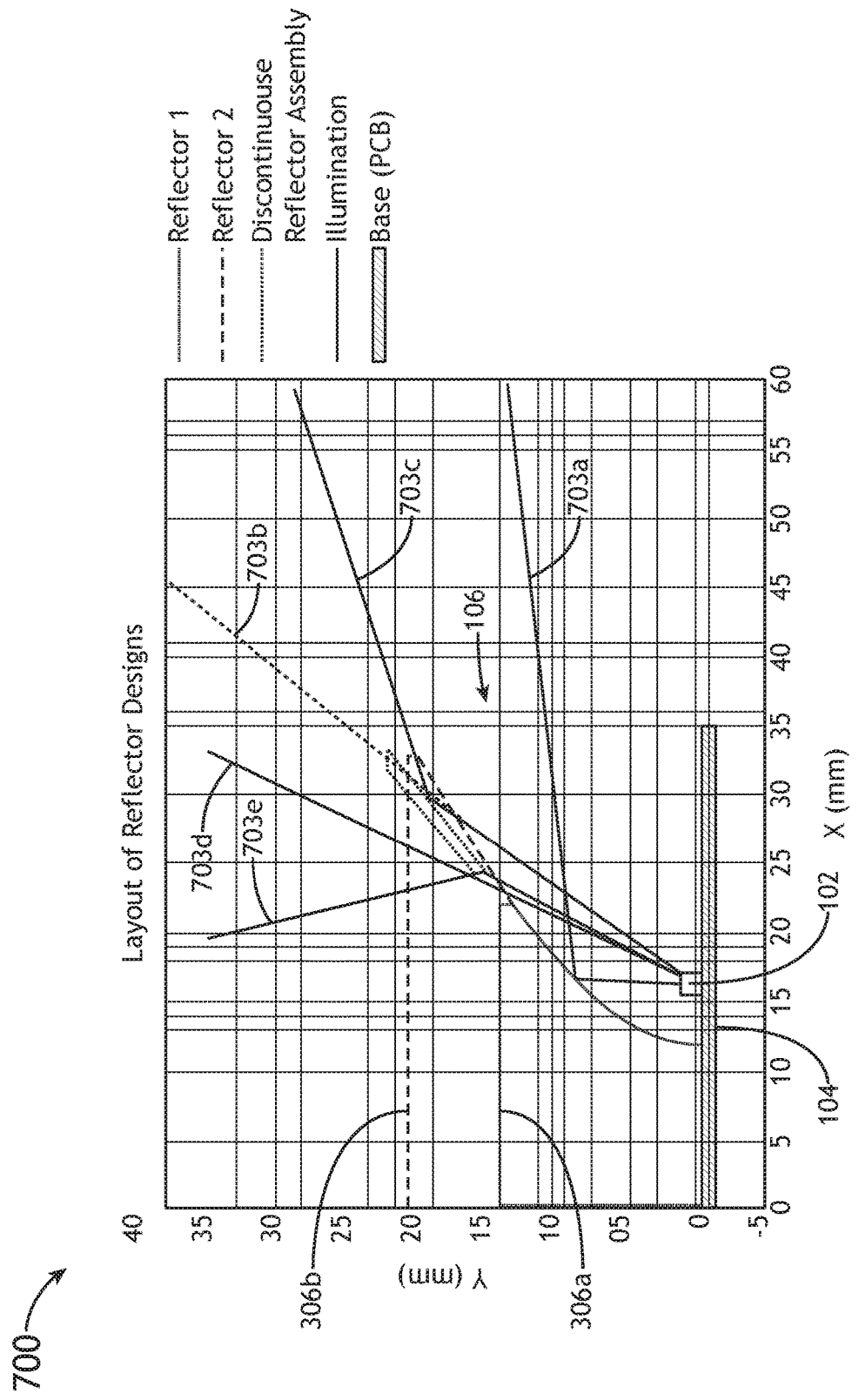
FIG. 7 illustrates a graph of an angular light distribution profile of an anti-collision light, in accordance with one or more embodiments of the present disclosure.

FIG. 7 illustrates a graph 700 of an angular light distribution profile of an anti-collision light 100, in accordance with one or more embodiments of the present disclosure.

As noted previously herein with respect to FIG. 3, reflector assembly 306a and extended reflector assembly 306b represent reflector assemblies utilized by traditional anti-collision lights. Conversely, FIG. 7 also illustrates a discontinuous reflector assembly 106 of the present disclosure. In embodiments, as shown in graph 700, the reflective element 112 of the reflector assembly 106 may be configured to redirect illumination beams 703a, 703c from the one or more illumination sources 102.

In particular, it is noted herein that the reflector assembly 106 of the present disclosure may redirect illumination which would otherwise be transmitted directly/uncaptured by the traditional reflector assembly 306a. For example, as shown in graph 700, the traditional reflector assembly 306a may not capture illumination beam 703b, such that the illumination beam 703b would be pass uncaptured at a high vertical angle 107. Comparatively, reflector assembly 106 may be configured to redirect the illumination beam 703b as redirected illumination beam 703c, which is emitted at a lower vertical angle 107.

As shown in graph 700, the one or more transmissive portions 114 of reflector assembly 106 may be configured to transmit one or more illumination beams 703 through the reflector assembly 106/reflective element 112. For example, the one or more transmissive portions 114 may be configured to transmit illumination beam 703d directly through the reflector assembly 106, such that the illumination beam 703d is transmitted through the reflector assembly 106 without redirection. Comparatively, the one or more transmissive portions 114 may be configured to transmit illumination beam 703e through the reflector assembly 106, such that the illumination beam 703e is transmitted through the reflector assembly 106 with redirection from reflective surface 119 positioned adjacent to the one or more transmissive portions 114.

In practice, redirecting previously uncaptured illumination with the reflector assembly 106 of the present disclosure may serve to lower the light intensity at higher vertical angles 107, and increase the light intensity at lower vertical angles 107. Additionally, as compared to the extended reflector assembly 306b, which effectively cuts off all illumination at high vertical angles 107, the reflector assembly 106 of the present disclosure provides for the transmission of illumination at high vertical angles 107 through the reflector assembly 106 via transmissive portions 114. Thus, it is contemplated herein that the reflector assembly 106 of the present disclosure may provide for an improved angular light distribution as compared to previous approaches.

Figure 8:
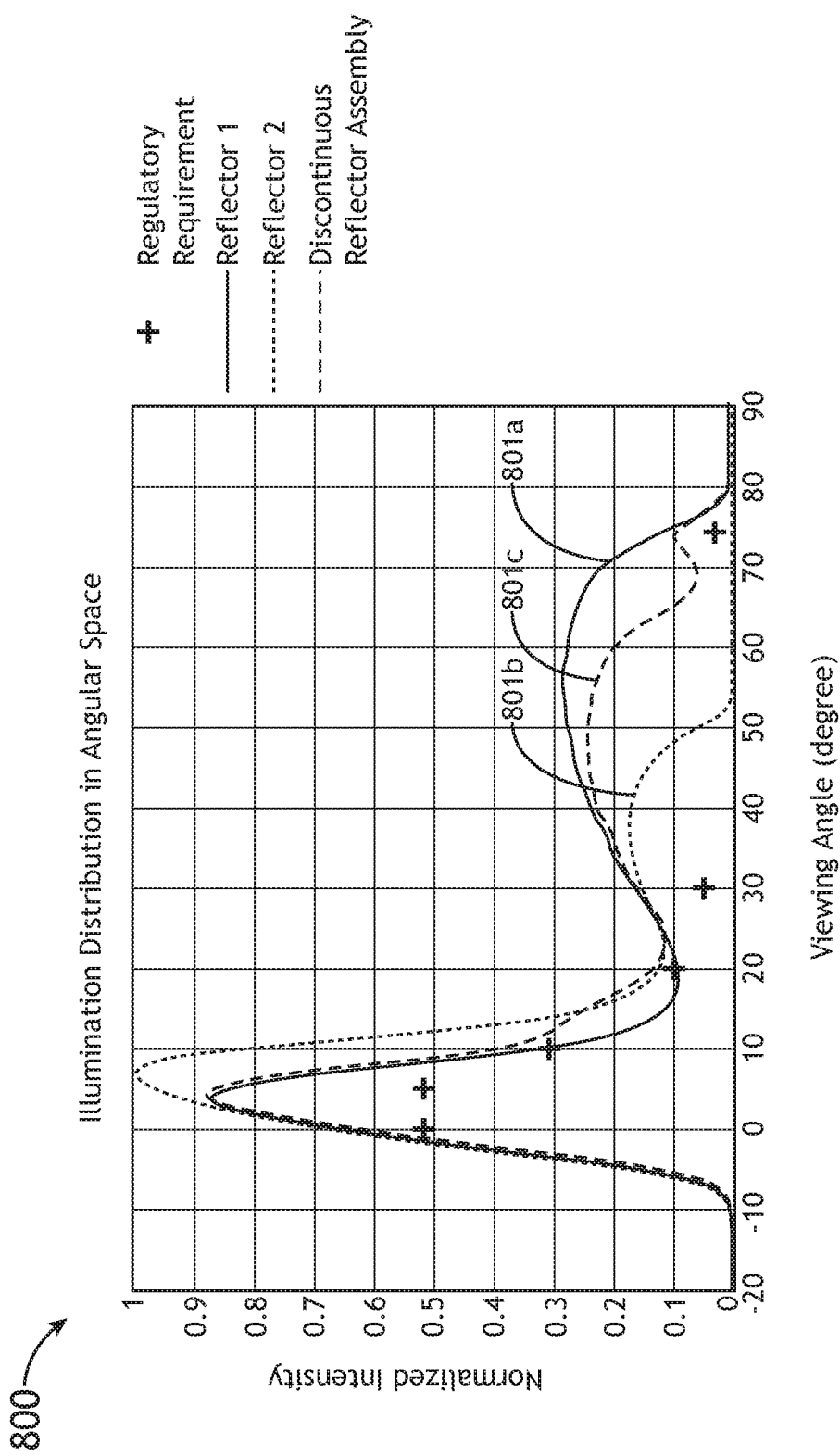
FIG. 8 is a graph illustrating the light intensity distribution of an anti-collision light, in accordance with one or more embodiments of the present disclosure.

FIG. 8 is a graph 800 illustrating the light intensity distribution of an anti-collision light 100, in accordance with one or more embodiments of the present disclosure. In particular, graph 800 illustrates a light intensity curve 801a achieved by the shorter reflector assembly 306a, and a light intensity curve 801b achieved by the extended reflector assembly 306b, and a light intensity curve 801c achieved by the reflector assembly 106 of the present disclosure.

As shown in graph 800, the reflector assembly 106 may provide for similar illumination intensities at lower vertical angles 107 as that of the reflector assembly 306a, far exceeding the regulatory requirements at vertical angles 107 from 0-5°. The reflector assembly 106 may also provide improved performance within the transition region, providing improved illumination intensities over both reflector assembly 306a and extended reflector assembly 306b. Additionally, at high vertical angles 107, the reflector assembly 106 of the present disclosure may be configured to lower the illumination intensity at high vertical angles 107, thereby reducing wasted illumination. Furthermore, as compared to the extended reflector assembly 306b, which cuts off all illumination at higher angles and fails to comply with the regulatory requirement at a vertical angle 107 of 75°, the reflector assembly 106 of the present disclosure may be configured to maintain a sufficiently high illumination intensity to comply with all regulatory requirements, even those at high vertical angles 107.

It is contemplated herein that various aspects and features of the present disclosure may be modified without departing from the spirit and scope of the present disclosure. In particular, it is contemplated herein that features of the anti-collision light 100 may be modified in order to provide compatibility with varying illumination sources 102, and to comply with changing regulatory requirements. For example, the number and/or placement of the one or more transmissive portions 114 along the reflective element 112 may be modified in order adjust the light intensity curve 801c illustrated in FIG. 8. By way of another example, the surface profile of the reflective element 112 may be modified such that it may be modeled by varying equations (e.g., linear equations, parabolic equations, hyperbolic equations, complex polynomial equations, and the like) in order to alter the illumination field of view 103 of the anti-collision light 100. Other features/characteristics of the anti-collision light 100 which may be modified may include, but are not limited to, the shape of the illumination sources 102 and/or reflective element 112, placement of the reflector assembly 106 relative to the illumination sources 102, illumination direction of the illumination sources 102, characteristics of the transmissive portions 114 (e.g., size, width), and the like.

Figure 9:
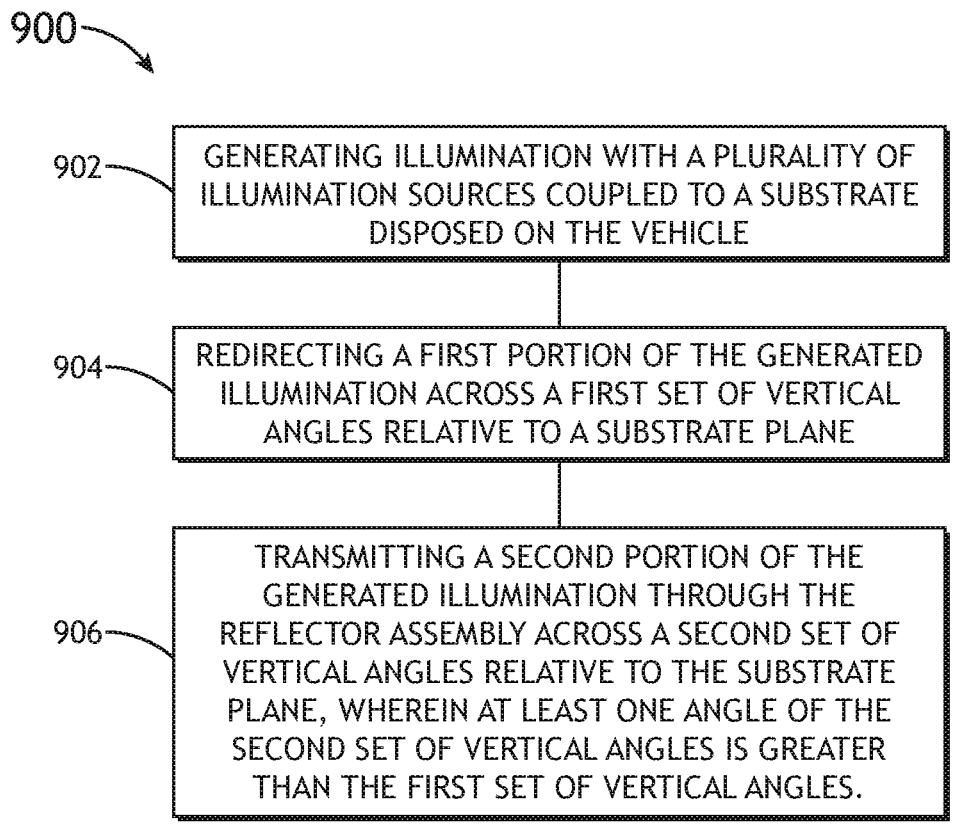
FIG. 9 illustrates a flowchart of a method for distributing light to alert observers of the presence of a vehicle, in accordance with one or more embodiments of the present disclosure.

FIG. 9 illustrates a flowchart of a method 900 for distributing light to alert observers of the presence of a vehicle (e.g., aircraft 101), in accordance with one or more embodiments of the present disclosure. It is noted herein that the steps of method 900 may be implemented all or in part by vehicle anti-collision light 100. It is further recognized, however, that the method 900 is not limited to the vehicle anti-collision light 100 in that additional or alternative system-level embodiments may carry out all or part of the steps of method 900.

In a step 902, illumination is generated with a plurality of illumination sources coupled to a substrate disposed on the vehicle. For example, as shown in FIG. 5A, one or more illumination sources 102 coupled to a substrate 104 may be configured to generate illumination. Additionally, the anti-collision light 100 illustrated in FIG. 5A may be configured to be coupled to an exterior surface of a vehicle (e.g., aircraft 101) via one or more attachment assemblies 110.

In a step 904, a first portion of the generated illumination is redirected across a first set of vertical angles relative to a substrate plane. For example, as shown in FIG. 5B, a reflective element 112 of a reflector assembly 106 may be configured to redirect at least a portion of the illumination generated by the illumination sources 102 across a plurality of vertical angles 107 relative to a substrate plane 109.

In a step 906, a second portion of the generated illumination is transmitted through the reflector assembly across a second set of vertical angles relative to the substrate plane. In embodiments, at least one angle of the set of vertical angles is greater than the first set of vertical angles. For example, the reflective element 112 may be configured to redirect the first portion of illumination across a first set of vertical angles 107 relative to the substrate plane 109, and the one or more transmissive portions 114 may be configured to transmit a second portion of illumination across a second set of vertical angles 107 relative to the substrate plane 109, wherein at least one angle of the second set of vertical angles is greater than the first set of vertical angles. In embodiments, the one or more transmissive portions 114 may be disposed within the reflective element 112 such that the one or more transmissive portions 114 are completely bounded within the one or more reflective surfaces of the reflective element 112.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A vehicle anti-collision light comprising:
one or more illumination sources disposed on a substrate;
a reflector assembly coupled to the substrate at a base, the reflector assembly comprising:
a reflective element including one or more reflective surfaces configured to redirect a first portion of illumination; and
one or more transmissive portions configured to transmit a second portion of illumination through the reflective element, wherein the one or more transmissive portions comprise at least one of an aperture, a transparent material, or a lens,
wherein the one or more transmissive portions are bounded within the one or more reflective surfaces of the reflective element such that the reflective element includes one or more reflective surfaces between the base and the one or more transmissive portions, and one or more reflective surfaces between the one or more transmissive portions and a distal edge of the reflective element, the reflective element is configured to redirect the first portion of illumination across a first set of vertical angles relative to a substrate plane,
wherein the one or more transmissive portions are configured to transmit a second portion of illumination across a second set of vertical angles relative to the substrate plane, at least one angle of the second set of vertical angles is greater than the first set of vertical angles, the one or more transmissive portions include horizontal transmissive slits which are disposed within the reflective element such that the horizontal transmissive slits are oriented parallel to the substrate plane, the one or more transmissive portions result in a discontinuous reflective element where a top portion and a bottom portion of the reflective element are coupled together via one or more connecting portions.

2. The vehicle anti-collision light of claim 1, wherein the one or more illumination sources are disposed on the substrate in a closed curve configuration, and wherein the reflector assembly is coupled to the substrate within an enclosed region of the closed curve.

3. The vehicle anti-collision light of claim 2, wherein the reflector assembly is configured to distribute illumination over a lateral angle of 360 degrees about an axis normal to the substrate.

4. The vehicle anti-collision light of claim 1, wherein the reflective element comprises a hyperbolic reflective element.

5. The vehicle anti-collision light of claim 1, wherein the reflective element of the reflector assembly comprises a multifaceted reflective element including a plurality of reflective surfaces.

6. The vehicle anti-collision light of claim 1, wherein the reflective element extends over at least a portion of the one or more illumination sources.

7. The vehicle anti-collision light of claim 1, wherein the one or more transmissive portions are disposed within the reflective element at equivalent heights with respect to the base and the distal edge, such that a first transmissive portion and an additional transmissive portion are disposed within the reflective element a first distance away from the base and a second distance away from the distal edge.

8. A vehicle anti-collision light for optimizing angular light distribution, comprising:
   a substrate;
   a plurality of illumination sources disposed on the substrate;
   a reflector assembly coupled to the substrate, the reflector assembly comprising:
      a reflective element coupled to the substrate at a base proximate to the plurality of illumination sources, the reflective element further including one or more reflective surfaces configured to:
         receive illumination generated by the plurality of illumination sources;
         redirect a first portion of the generated illumination; and
      one or more transmissive portions disposed within the reflective element between the base a distal edge of the reflective element, wherein the one or more transmissive portions comprise at least one of an aperture, a transparent material, or a lens, wherein the one or more transmissive portions are bounded by the one or more reflective surfaces, the one or more transmissive portions configured to transmit a second portion of illumination through the reflector assembly, the reflective element is configured to redirect the first portion of illumination across a first set of vertical angles relative to a substrate plane,
   wherein the one or more transmissive portions are configured to transmit a second portion of illumination across a second set of vertical angles relative to the substrate plane, at least one angle of the second set of vertical angles is greater than the first set of vertical angles, the one or more transmissive portions include horizontal transmissive slits which are disposed within the reflective element such that the horizontal transmissive slits are oriented parallel to the substrate plane, the one or more transmissive portions result in a discontinuous reflective element where a top portion and a bottom portion of the reflective element are coupled together via one or more connecting portions.

9. The vehicle anti-collision light of claim 8, wherein the plurality of illumination sources are disposed on the substrate in a closed curve configuration, and wherein the reflector assembly is coupled to the substrate within an enclosed region of the closed curve.

10. The vehicle anti-collision light of claim 9, wherein the reflector assembly is configured to distribute illumination over a lateral angle of 360 degrees about an axis normal to the substrate.

11. The vehicle anti-collision light of claim 8, wherein the reflective element comprises a rotationally symmetric reflective element.

12. The vehicle anti-collision light of claim 8, wherein the reflective element comprises a hyperbolic reflective element.

13. The vehicle anti-collision light of claim 11, wherein the one or more transmissive portions are disposed within the reflective element such that the one or more transmissive portions are distributed at regular intervals across the reflective element.

* * * * *